US009753435B2

(12) United States Patent
Brewer

(10) Patent No.: US 9,753,435 B2
(45) Date of Patent: Sep. 5, 2017

(54) VISUAL METRONOME APPLICATION

(71) Applicant: Don Brewer, Jupiter, FL (US)

(72) Inventor: Don Brewer, Jupiter, FL (US)

( * ) Notice: Subject to any disclaimer, the term of this patent is extended or adjusted under 35 U.S.C. 154(b) by 0 days.

(21) Appl. No.: 15/055,099

(22) Filed: Feb. 26, 2016

(65) Prior Publication Data

US 2016/0252884 A1 Sep. 1, 2016

Related U.S. Application Data

(60) Provisional application No. 62/126,255, filed on Feb. 27, 2015.

(51) Int. Cl.

*G09B 15/00* (2006.01)
*G04F 5/02* (2006.01)
*G10H 1/00* (2006.01)

(52) U.S. Cl.

CPC ........... *G04F 5/025* (2013.01); *G10H 1/0016* (2013.01)

(58) Field of Classification Search

CPC . G04F 5/025; G04F 5/02; G04F 5/027; G04F 8/08; G10H 1/0016
USPC ........................................................... 84/484
See application file for complete search history.

(56) References Cited

U.S. PATENT DOCUMENTS

| | | | |
|---|---|---|---|
| 3,901,121 | A | 8/1975 | Kleiner |
| 4,649,794 | A | 3/1987 | George |
| 5,447,089 | A | 9/1995 | Marrash |
| 5,751,825 | A | 5/1998 | Myers et al. |
| 7,368,651 | B2 | 5/2008 | Duke |
| 7,432,433 | B2 | 10/2008 | Boxer |
| 7,557,287 | B2 | 7/2009 | Wilson et al. |
| 7,777,122 | B2 | 8/2010 | Hurwitz et al. |
| 8,278,542 | B2 | 10/2012 | Kashioka |
| 2007/0199431 | A1 | 8/2007 | Kashioka |

(Continued)

FOREIGN PATENT DOCUMENTS

CN 2263363 Y * 9/1997

OTHER PUBLICATIONS

2008 Fairchild Semiconductor Corporation, LM78XX/LM78XXA, 3-Terminal 1 a Positive Voltage Regulator, 1 page, Sep. 2014.

(Continued)

*Primary Examiner* — Jianchun Qin
(74) *Attorney, Agent, or Firm* — Dinsmore & Shohl LLP

(57) ABSTRACT

A visual metronome for use with a drum kit, including circuitry for generating a succession of light signals according to a selected flashing pattern defined by frequency and duration. A circuit splitter is in operative communication with the metronome for multiplying the light signals. A plurality of individual light emitting components are in operative communication with the circuit splitter, the light emitting components being mounted to individual components associated with the drum kit to simultaneously display the flashing pattern corresponding to the multiplied light output signals at locations visible to a user of the drum kit. A plurality of cables extend between the circuit splitter and respective light emitting components. The light emitting components can each further include a different color in order to provide enhanced visibility in various stage lighting situations. A power supply communicates the metronome, including any of a battery or a 9V power outlet plug.

16 Claims, 4 Drawing Sheets

(56) References Cited

U.S. PATENT DOCUMENTS

| | | | | |
|---|---|---|---|---|
| 2014/0015429 | A1* | 1/2014 | Luo | H05B 37/02 315/193 |
| 2014/0250905 | A1 | 9/2014 | Lillard | |
| 2014/0260905 | A1* | 9/2014 | Lillard | G09B 15/00 84/484 |

OTHER PUBLICATIONS

Toshiba, Product Sheet, 1 Page, 2SC1815 Audio Frequency General Purpose Amplifier Applications, Driver Stage amplifier applications, no date availalbe.

Toshiba, Product Sheet, 1 Page, 2SA1015(L) Audio Frequency Amplifier Applications Low Noise Amplifier Applications, , no date available.

Vishay, General Purpose lastic Recifier, 1N4001 thru 1N4007, Visay General Semiconductor, 1 page.

* cited by examiner

VISUAL METRONOME APPLICATION

CROSS-REFERENCE TO RELATED APPLICATIONS

This application claims the benefit of U.S. Provisional Application 62/126,255 filed on Feb. 27, 2015, the contents of which are incorporated herein in its entirety.

FIELD OF THE INVENTION

The present invention relates generally to metronome and musical timing devices. More particularly, the present invention discloses a visual metronome which produces a visual (light) signal, and utilizing a circuit splitter to provide the same signal simultaneously from the metronome to different drums or drum sets. In one variant, a plurality of four lights are provided in a pod arrangement and which can be different colors in order to render them visible in various stage lighting situations and in order to promote the musicians at disparate locations being held to an accurate tempo.

BACKGROUND OF THE INVENTION

The prior art is documented with various types of metronome devices, the objective in each instance being to provide some form of optical or acoustic display of tempo, phase, and the division of the phases of music pieces or movement rhythms. A first example of this is the metronome disclosed in Boxer, U.S. Pat. No. 7,432,433, and which teaches a housing (1) with a display for the optical display of a movement which describes a curve (3) similar to a parabola.

Means for controlling the display are further provided so that the optical movement oscillates with adjustable frequency and with additional means for the selective electrical generation of tones for acoustically marking the inflection points of the movement and for the selective further acoustic division of the time intervals between the inflection points of the movement. The display includes a row of discrete light sources (2), arranged along a curve (3) similar to a parabola. The light sources (2) may be controlled such as to generate a moving light which oscillates back and forth along the row of light sources with adjustable frequency.

U.S. Pat. No. 4,649,794, to George, teaches a visual electronic metronome having a plurality of LED's arranged in a first V-shaped column and a second column extending downwardly from the topo of the V. The LED's are in turn so as to produce the appearance of a block of light moving along the V-shaped column and then down the second column until a leading edge of the block of light reaches the bottom of the column. At that point a strobe light produces a flash indicative of the intended beat. The user can thus observe the approach of the beat and meet it exactly preparing the muscles for playing the instrument according to the visually observed position of the block of light approaching the beat.

US 2014/0260905, to Lillard, discloses a tool for teaching the playing of a musical instrument and includes a control and signaling unit that instructs a student as to the proper time to strike the instrument. The control is configured to provide a series of signals, through a signaling unit, that denote a tempo for the music or beat, a warning that the time to strike the instrument is approaching, and a signal when it is time to strike the instrument in accordance with the beat or music.

In one designated variant, a signaling unit 20 includes a plurality of horizontal strips 21 *a*, 21 *b*, 21 *c*, and 21 *d* (collectively designated 21) each having eleven light emitting diode (LED) lights. In operation, the LED lights of signaling unit 20 illuminate and warn the student of the proper time to strike an instrument.

In one exemplary embodiment, all of the LED lights of a signaling unit 20 are the same color. The outermost lights 22 in a strip 21 blink the tempo of the beat. The inner lights 23 illuminate sequentially from the outermost lights inward to provide the student a warning to prepare to strike (hit) the instrument. Finally, the centermost light 24 illuminates, conveying to the student the appropriate time to strike the instrument.

In the exemplary embodiment, each strip conveys the striking time for a different beat, with the topmost strip 21 *a* conveying the first beat to strike on the instrument, the next-lower strip 21*b* conveying the second beat, strips 21*c* and 21*d* conveying the third and fourth beats respectively, and then returning to the topmost strip 21*a* for the fifth beat in the sequence. In a second exemplary embodiment, three different color LED lights, such as red, yellow, and green, are used for each lighting strip 21. In this embodiment the outermost lights 22 in strip 21 are red and denote tempo. The inner lights 23 are yellow to denote a warning of the approaching time to strike. Finally, the centermost light 24 is green to denote time to strike.

U.S. Pat. No. 5,447,089, to Marrash, teaches an electronically programmable metronome having a footswitch for allowing a user to adjust the tempo over a continuous range without taking hands off an instrument or interrupting playing. A microcontroller is pre-programmed with a metronome click pattern in any selected note duration value.

The user operates a footswitch to increase the tempo automatically in continuous increments and to hold a desired tempo. A digital pulse voltage source and acoustic pulse switch are responsive to control logic to produce different amplitudes and tones for three types of clicks, i.e., Loud, Medium, and Soft, in order to provide distinctly different audible click patterns.

Headphones, an audio speaker, and/or an LED indicator can be used to provide audible and visual cues of the tempo to the user. The metronome unit includes a display for menu selection, prompts, and visual cues for adjustment of the tempo and selection of types of clicks in a beat pattern. The microcontroller for the metronome unit can be programmed with any combination of time signatures, rhythms, or patterns with desired cues or accents.

SUMMARY OF THE INVENTION

The present invention discloses a visual metronome for use with a drum kit, the metronome including circuitry for generating a succession of light signals according to a selected flashing pattern defined by frequency and duration. A circuit splitter is in operative communication with the metronome component for multiplying the light signals. A plurality of individual light emitting components are in operative communication with the circuit splitter, the light emitting components being mounted to individual components associated with the drum kit to simultaneously display the flashing pattern corresponding to the multiplied light output signals at locations visible to a user of the drum kit.

Additional features include a plurality of cables extending between said circuit splitter and respective light emitting components. The light emitting components can each further include a different color in order to provide enhanced visibility in various stage lighting situations. Additional features include a power supply communicated to said metronome, such potentially including any of a portable battery supply or a 9V power outlet plug.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
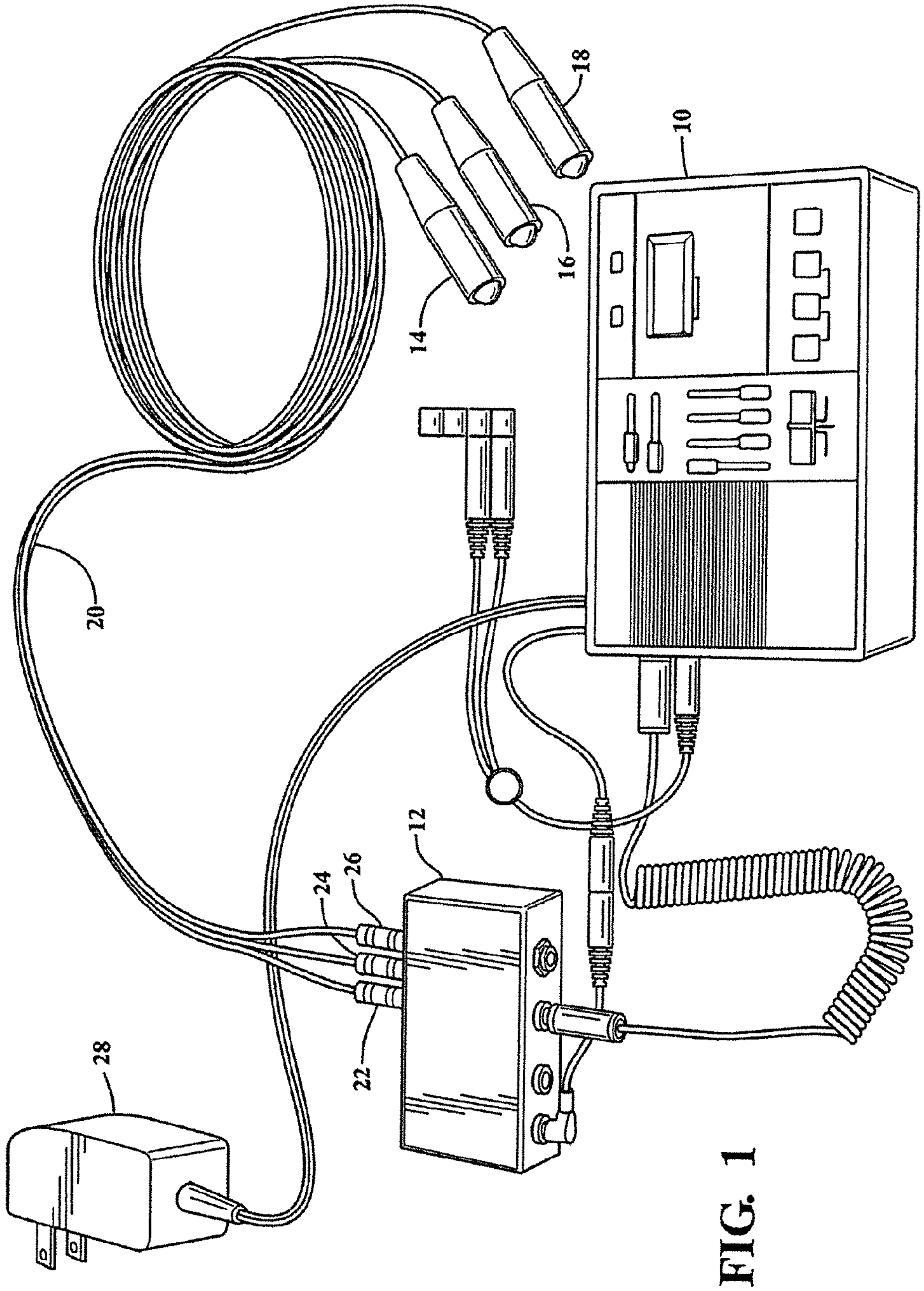
FIG. 1 is an assembly view of metronome, power supply, circuit splitter, and plurality (pod) of flashing lighting elements according to one variant of the present invention.
Figure 3:
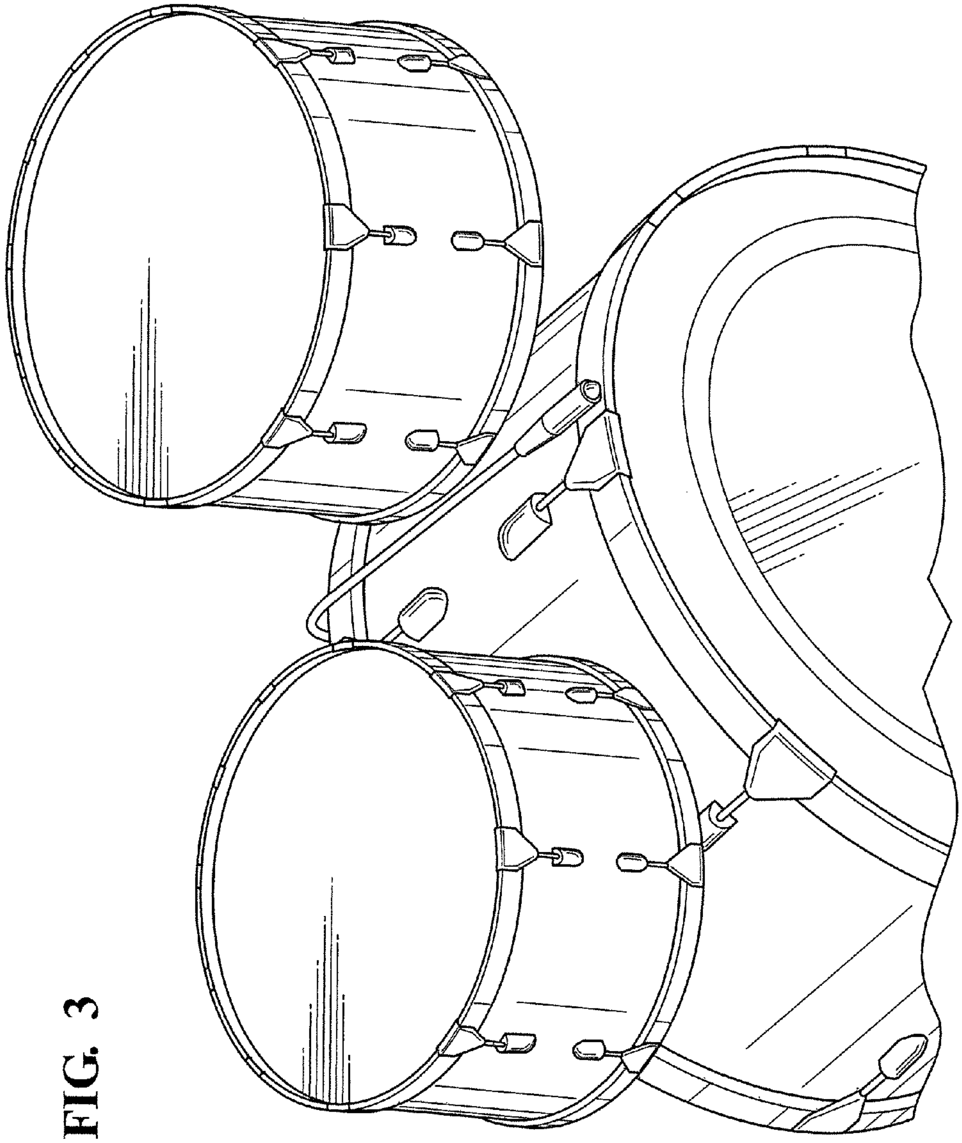
FIG. 3 is an environmental view illustrating the visual light elements mounted to various drum locations.

Referring now to FIG. 1, the present invention discloses a visual metronome 10 for use with a drum kit (see further individual drums 2, 4, 6 and 8 in FIG. 3). As will be described in further detail, the metronome 10 produces a visual (light) signal and, utilizing a circuit splitter 12 to which it is operatively connected, is capable of replicating the same signal simultaneously to the different drums 2, 4, 6 and 8 or drum sets.

Included among the advantages of the light-based visual metronome is the ability of the musician to maintain a visually discernable beat pattern corresponding to the programmed flashing intervals of the light output, and as opposed to the use of sound (audible clicks etc.). As is known, light travels much faster than sound and, as such, a visual style metronome can provide a relatively minor however potentially useful improvement in precision over other metronome types.

It is also appreciated that use of an audible style metronome is impractical in concert or other live performance conditions, in no small part due to the fairly high decibel levels associated with such events as well as the desire to not add any undesirable acoustics to the performance. In other instances, a musician may be hearing impaired to some degree and/or may simply not desire to hear audible clicks.

Figure 2:
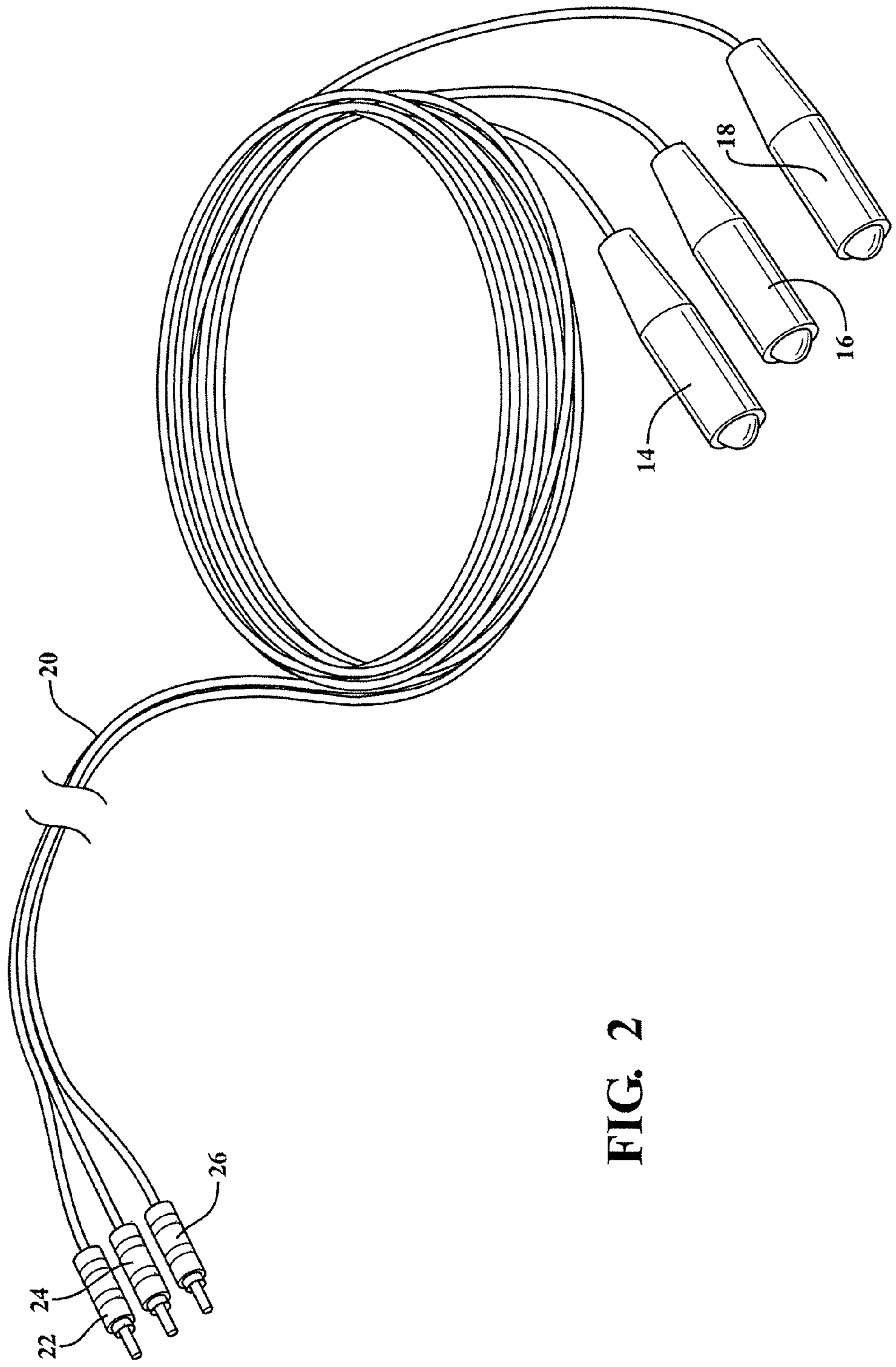
FIG. 2 is another view of the flashing (visual) light elements.

As is additionally depicted in FIG. 2, a plurality of individual light emitting components, see at 14, 16, 18 et seq., are provided and are in operative communication with the circuit splitter. In the non-limiting illustrated variant of FIG. 3, the light emitting components, see at 14 and 16, are mounted or otherwise affixed to selected ones (see at 2 and 4) of the individual drums 2, 4, 6 and 8 associated with the drum kit, this in order to simultaneously display the flashing pattern corresponding to the multiplied light output signals at locations visible to a user of the drum kit.

The light emitting components can be provided in any number or arrangement and, in one variant, a plurality of four lights are provided in a pod arrangement. The lights may also, without limitation, be provided with different colors in order to render them continuously visible to the musician in any given stage lighting situation, and such as in which general performance lighting can include similar flashing or strobe style lighting, and from which the performer needs to visually differentiate the LED components 14, 16, 18 by utilizing contrasting color patterns. The present invention additionally promotes use by a number of musicians performing in the same group, and who may further be at disparate locations (e.g. a concert stage), while still being held together to an accurate tempo.

Additional features include the lighting elements 14, 16, 18 et seq., being communicated to the circuit splitter 12 via a wiring harness 20 with input plugs 22, 24, 26, et. seq. connected to ports associated with the circuit splitter. A power supply 28 is provided for operating the metronome and can, without limitation, include any of a portable battery supply or, as shown, a 9V plug in power supply.

Figure 4:
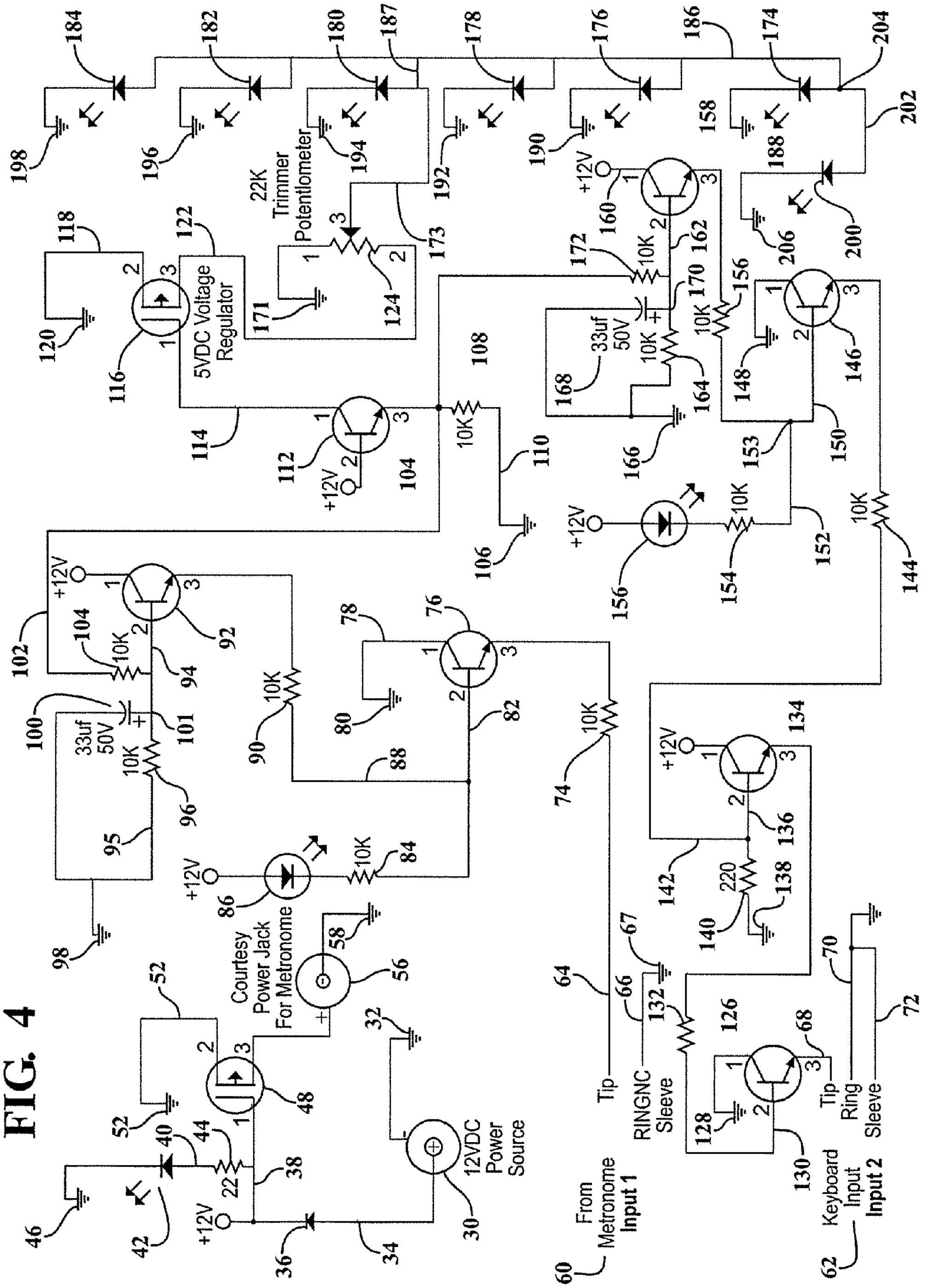
FIG. 4 is a schematic of the visual metronome according to the present invention.

Proceeding finally to FIG. 4, an exemplary schematic is shown of a circuit splitter arrangement associated with the visual metronome according to one non-limiting configuration for providing a desired flashing light sequence through a plurality of light emitting (LED) diodes or like illuminating elements (see again lighting elements 14, 16 and 18 in FIGS. 1-3). By way of advance explanation, the selected circuit depicted in FIG. 4 provides but one non-limiting arrangement of a series of switching transistors, diode's voltage regulators, resistors and capacitors in order to produce a synchronous, amplified and flashing light pattern through a plurality of individual light emitting outputs.

A 12V DC power source 30 is grounded at 32 and leads, via line 34, to diode 36, which is defined as a two terminal electronic component which functions to allow an electric current to pass in one direction (called the diode's forward direction), while blocking current in the opposite direction (the reverse direction). Thus, the diode can be viewed as an electronic version of a check valve. This unidirectional behavior is called rectification, and is used to convert alternating current to direct current.

Line 38 is in series communication with line 34 and branches, via line 40, into a Power on LED diode 44 (see also 220 Ohm resistor 44 and ground 46). As is known, a resistor is a passive two-terminal electrical component that implements electrical resistance as a circuit element. Resistors act to reduce current flow, and, at the same time, act to lower voltage levels within circuits. In electronic circuits, resistors are used to limit current flow, to adjust signal levels, bias active elements, and terminate transmission lines among other uses.

A 9V DC voltage regulator 48 is located in line 38 (via input location 1) for maintaining a constant voltage and further includes an output 2 leading to line 50 and ground 52, as well as a separate output 3 communicating with line 54 to a metronome power jack 56 (grounded at 58). A simple voltage regulator can be made from a resistor in series with a diode (or series of diodes) and operate by comparing the actual output voltage to some fixed reference voltage. Any difference is amplified and used to control the regulation element in such a way as to reduce the voltage error.

A pair of inputs 60 (from metronome) and 62 (from keyboard) are provided, input 60 including tip line 64 and sleeve line 66 to ground 67, with input 62 likewise including tip 68, ring 70 and sleeve 72 lines. Input 1 (60) from the metronome (again at 10) extends through tip line (wire) 64, series resistor 74 (10K) and to bi-polar junction (BJT) transistor 76, defined as a type of transistor that uses both electron and hole charge carriers. BJT transistors use two junctions between two semiconductor types, n-type and p-type.

BJTs are manufactured in two types, NPN and PNP, and are available as individual components, or fabricated in integrated circuits, often in large numbers. The NPN type transistor, depicted at 76, consists of a layer P-doped semiconductor (the "base") between two N-doped layers (as shown location 3 of transistor 76 corresponds to n-type emitter, location 2 p-type base and location 1 n-type collector). By way of further explanation, the base is physically located between the emitter and the collector and is made from lightly doped, high resistivity material. The collector surrounds the emitter region, making it almost impossible for the electrons injected into the base region to escape without being collected, thus making the resulting value of a very close to unity, and so, giving the transistor a large 13. A cross section view of a typical BJT indicates that the collector-base junction has a much larger area than the emitter-base junction.

A small current entering the base is amplified to produce a large collector and emitter current. That is, when there is a positive potential difference measured from the emitter of an NPN transistor to its base (i.e., when the base is high relative to the emitter) as well as positive potential difference measured from the base to the collector, the transistor becomes active. In this "on" state, current flows between the collector and emitter of the transistor. Most of the current is carried by electrons moving from emitter to collector as minority carriers in the P-type base region. To allow for greater current and faster operation, most bipolar transistors used today are NPN because electron mobility is higher than hole mobility.

In operation, the basic function of a BJT is to amplify current. This allows BJTs to be used as amplifiers or switches, giving them wide applicability in electronic equipment, including computers, televisions, mobile phones, audio amplifiers, industrial control, and radio transmitters.

Line 78 associated with collector (1) of BJT 76 leads to ground 80, whereas base (2) communicates with line 82 leading, via 10K resistor 84 to input status LED 86. Line 88 extends in parallel to line 82 and following 10K resistor 90, extends to bi-polar junction transistor 92.

A base communicating line 94 of BJT 92 includes a first looped circuit. Line 95, with 10K resistor 96, and polarized capacitor 100 (rated 33 micro-farads (33 uf) at 50V. As is known, a capacitor is a passive two-terminal electrical component used to store electrical energy temporarily in an electric field. Line 95 is grounded at 98 and, following capacitor 100, rejoins line 94 at node 101.

The forms of practical capacitors vary widely, but all contain at least two electrical conductors (plates) separated by a dielectric (i.e. an insulator that can store energy by becoming polarized). The conductors can be thin films, foils or sintered beads of metal or conductive electrolyte, etc. The nonconducting dielectric acts to increase the capacitor's charge capacity.

Materials commonly used as dielectrics include glass, ceramic, plastic film, air, vacuum, paper, mica, and oxide layers. Capacitors are widely used as parts of electrical circuits in many common electrical devices. Unlike a resistor, an ideal capacitor does not dissipate energy. Instead, a capacitor stores energy in the form of an electrostatic field between its plates.

Line 102 branches in parallel from base line 94 of BJG 92 and extends to node 104 communicating both to ground 106, via 10K resistor 108 in line 110, as well as to NPN type BJT transistor 112. The collector of BJT 112 includes line 114 in turn extending to 5V DC voltage regulator 116 (see as also described at 48).

As depicted, the voltage regulator 116 (in one non-limiting configuration a LM7812 regulator denotes a family of self-contained fixed linear voltage regulator integrated circuits. The 78xx family is commonly used in electronic circuits requiring a regulated power supply due to their ease-of-use and low cost. For ICs within the family, the xx is replaced with two digits, indicating the output voltage (for example, the 7805 has a 5-volt output, while the 7812 produces 12 volts).

The 78xx line are positive voltage regulators in that they produce a voltage that is positive relative to a common ground. 78xx ICs have three terminals and support an input voltage anywhere from around 2.5 volts over the intended output voltage up to a maximum of 35 to 40 volts depending on the model, and typically provide 1 or 1.5 amperes of current (though smaller or larger packages may have a lower or higher current rating).

As further shown for voltage regulator 116, terminal 1 is input (via line 114), terminal 2 an output line 118 to ground 120, and terminal 3 an output line 122 extending to a 22K trimmer potentiometer 124, such further defined as a three-terminal resistor with a sliding or rotating contact that forms an adjustable voltage divider. The measuring instrument called a potentiometer is essentially a voltage divider used for measuring electric potential (voltage), with the component being an implementation of the same principle, hence its name.

Potentiometers are commonly used to control electrical devices such as volume controls on audio equipment. Potentiometers operated by a mechanism can be used as position transducers, for example, in a joystick. Potentiometers are rarely used to directly control significant power (more than a watt), since the power dissipated in the potentiometer would be comparable to the power in the controlled load.

Referring back to keyboard input 62, tip line 68 extends to emitter (n layer or pin 3) of BJT/NPN transistor 126 (see again as previously described at 76), with collector (n layer or pin 1) to ground at 128 and base (p layer or pin 2) to line 130 which extends to 10K resistor 132 and then onward to n type layer (pin 3) of BJT transistor 134 (same as previously described at 92).

The transistor 134 includes n layer collector (pin 1) to power 12V and base (p layer or pin 2) communicating, via line 136, to 220K resistor 140 with ground 138. Line 142 extends from line 136 and, via further 10K resistor 144, to n-layer emitter (pin 3) of further NPN type BJT 148, this further including collector (n-layer or pin 1) to ground 148 as well as line 150 extending from p-layer (or pin 2) base.

Line 152 connects to node location 153 of line 150, with line 152 extending to 10K resistor 154 and, subsequently to +12V powered input 2 LED 156. Line 150 extends beyond node 153 and, following 10K resistor 156, extends to emitter input (n-layer) of BJT/NPN transistor 158 (see as described also at 92 and 134). Collector node (also n layer at 160 is connected at +12V) and base (p layer) is communicated by line 162 which both in turn communicates with a looped circuit with 10K resistor 164 (see previously also at 96) and polarized capacitor 168 (rated 33 micro-farads (33 uf) at 50V as also previously shown at 100). The looped circuit consisting of components 164 and 168 is grounded at 166 and, following capacitor 168, rejoins line 168 at node 170.

At this point, line 102 extending from afore-described BJT transistor 92 (following intersecting node 104) communicates with line 162 (via 10K resistor 172) to complete the description of the operational circuit components. The afore-mentioned variable resistor trimmer potentiometer 124 (grounded at 171) is a miniature adjustable electrical component designed for "set and forget" applications to "trim" the value of a resistor in order to provide an exact gain, output voltage, or current.

Trimmer potentiometers (also referred to as trimpots), such as again at 124, are mounted directly on circuit boards, typically set with a small screwdriver and designed for few adjustments during operation. They may either be single or multi-turn, with the multi-turn used in applications that require more precise settings. They can also be mounted either vertically or horizontally, depending on the requirements for adjusting the component.

A controlled output from the trimmer potentiometer 124, via line 173, results in the production of the plurality of output signals for delivery to the flashing output LED's, several of which are depicted in this variant at 174, 176, 178, 180, 182 and 184 in parallel along common or bus line 186. As previously described in FIGS. 1-3, the output LED's correspond to the physical light output lines 14, 16 and 18, such as again which may be attached to selected drums (in the instance of a drummer) or other locations in proximity to other musicians (such as further interpreted to include an orchestral conductor or the like).

The potentiometer output line 173 communicates with the bus line 186 via branch 187 associated with local LED 194. Each of the LED elements 174-184 are grounded (at 188-198). A further output status LED 200 communicates, via line 202 extending from node location 204 with bus line 186 and is grounded at 206.

In operation, a repetition of signals are produced by the metronome input 60 at a given frequency and corresponding to a series of audio clicks (with or without keyboard input signal 62). The signals are processed through the afore-described arrangement of switching transistors and ultimately ends up switching the voltage regulator transistor 116 so that (via the downstream located trimmer potentiometer 124) the LED elements 174-184 are operatively and repetitively (i.e. in synchronous or unison fashion) turned on and off corresponding to the metronome click signals.

In one operative protocol, the circuitry associated with the present design was tested up to 250 BPM (beats per minute) with latency (defined as the intervening period between click to flashing light impulses) being reduced to milliseconds. Owing further to the fast-on and fast-off nature of light impulses to an LED component (and as opposed to incandescent or other light sources), such frequencies are made possible.

Having described my invention, other and additional preferred embodiments will become apparent to those skilled in the art to which it pertains, and without deviating from the scope of the appended claims. This can include alternatively mounting the lighting elements to such as microphone stands, other instruments or at other visible locations which are easily and unobtrusively visible to the musicians, such as again who may dispersed across a performance stage during a live performance.

I claim:

1. A visual metronome for use with a drum kit, comprising:

a metronome generating a first audio input signal indicative of a series of audio clicks at a predetermined frequency and duration;

a circuit splitter in operative communication with said metronome, wherein said circuit splitter receives said first audio input signal and amplifies said first audio input signal through a plurality of bi-polar junction transistors into a signal for selectively activating a voltage regulator; and a plurality of individual light emitting components in operative communication with an output of said voltage regulator of said circuit splitter, wherein said output of said voltage regulator provides a power signal corresponding to said first audio input signal for simultaneously flashing of said plurality of individual light emitting components and said light emitting components being mounted to individual components associated with said drum kit to display a flashing pattern corresponding to said first audio input signal generated by said metronome at locations visible to a user of said drum kit.

2. The invention as described in claim 1, further comprising a plurality of cables extending between said circuit splitter and respective light emitting components.

3. The invention as described in claim 1, said light emitting components each further comprising a different color in order to provide enhanced visibility in various stage lighting situations.

4. The invention as described in claim 1, further comprising a power supply communicated to said metronome.

5. The invention as described in claim 4, said power supply further comprising a 9V power outlet and plug.

6. The invention as described in claim 1, further comprising a trimmer potentiometer interposed between said voltage regulator and said light emitting components.

7. A visual metronome for use with a drum kit, comprising:

a metronome generating a first audio input signal indicative of a series of audio clicks at a predetermined frequency and duration;

a circuit splitter in operative communication with said metronome, wherein said circuit splitter receives said first audio input signal and amplifies said first audio input signal through a plurality of bi-polar junction transistors into a signal for selectively activating a voltage regulator;

a plurality of individual light emitting components in operative communication with an output of said voltage regulator of said circuit splitter, wherein said output of said voltage regulator provides a power signal corresponding to the first audio input signal for simultaneously flashing of said plurality of individual light emitting components; and a plurality of cables extending between said circuit splitter and respective light emitting components, said light emitting components being mounted to individual components associated with said drum kit to simultaneously display a flashing pattern corresponding to said first audio input signal generated by said metronome at locations visible to a user of said drum kit.

8. The invention as described in claim 7, said light emitting components each further comprising a different color in order to provide enhanced visibility in various stage lighting situations.

9. The invention as described in claim 7, further comprising a power supply communicated to said metronome.

10. The invention as described in claim 9, said power supply further comprising a 9V power outlet and plug.

11. The invention as described in claim 7, further comprising a trimmer potentiometer interposed between said voltage regulator and said light emitting components.

12. A visual metronome for use with a drum kit, comprising:

a metronome generating a first audio input signal indicative of a series of audio clicks at a predetermined frequency and duration;

a circuit splitter in operative communication with said metronome, wherein said circuit splitter receives said first audio input signal and amplifies said first audio input signal through a plurality of bi-polar junction transistors into a signal for selectively activating a voltage regulator; and a plurality of individual light emitting components in operative communication with an output of said voltage regulator of said circuit splitter, wherein said output of said voltage regulator provides a power signal corresponding to said first input signal for simultaneously flashing of said plurality of individual light emitting components and said light emitting components each further including a different color in order to provide enhanced visibility in various stage lighting situations, said light emitting components being mounted to individual components associated with said drum kit to simultaneously display a flashing pattern corresponding to said first audio input signal generated by said metronome at locations visible to a user of said drum kit.

13. The invention as described in claim 12, further comprising a plurality of cables extending between said circuit splitter and respective light emitting components.

14. The invention as described in claim 12, further comprising a power supply communicated to said metronome.

15. The invention as described in claim 14, said power supply further comprising a 9V power outlet and plug.

16. The invention as described in claim 12, further comprising a trimmer potentiometer interposed between said voltage regulator and said light emitting components.

* * * * *